(12) United States Patent
Messelis

(10) Patent No.: US 12,492,573 B2
(45) Date of Patent: Dec. 9, 2025

(54) ANIMAL PROOF FENCE

(71) Applicant: GUARDIAR EUROPE BVBA, Zwevegem (BE)

(72) Inventor: Timothy Messelis, Menen (BE)

(73) Assignee: GUARDIAR EUROPE BVBA, Zwevegem (BE)

( * ) Notice: Subject to any disclaimer, the term of this patent is extended or adjusted under 35 U.S.C. 154(b) by 174 days.

(21) Appl. No.: 17/310,801

(22) PCT Filed: Mar. 1, 2019

(86) PCT No.: PCT/IB2019/051674
§ 371 (c)(1),
(2) Date: Aug. 25, 2021

(87) PCT Pub. No.: WO2020/178615
PCT Pub. Date: Sep. 10, 2020

(65) Prior Publication Data
US 2022/0120112 A1    Apr. 21, 2022

(51) Int. Cl.
*E04H 17/16*    (2006.01)
*E04H 17/00*    (2006.01)
*E04H 17/20*    (2006.01)

(52) U.S. Cl.
CPC ........... *E04H 17/16* (2013.01); *E04H 17/003* (2013.01); *E04H 17/166* (2013.01); *E04H 17/20* (2013.01)

(58) Field of Classification Search
CPC ..... E04H 17/003; E04H 17/04; E04H 17/045; E04H 17/16; E04H 17/165; E04H 17/166; E04H 17/161; E04H 17/163
See application file for complete search history.

(56) References Cited

U.S. PATENT DOCUMENTS

| | | | |
|---|---|---|---|
| 186,389 A * | 1/1877 | Washburn | E04H 17/003 256/11 |
| 1,476,853 A | 12/1923 | Tabor | |
| 4,526,347 A * | 7/1985 | McLoughlin | E04H 17/161 256/33 |
| 5,556,080 A | 9/1996 | Vise | |
| 6,113,076 A * | 9/2000 | Hancock-Bogese | A01M 29/30 256/50 |

(Continued)

FOREIGN PATENT DOCUMENTS

| | | |
|---|---|---|
| CH | 616480 A5 * | 3/1980 |
| DE | 3245857 A1 * | 6/1984 |

(Continued)

OTHER PUBLICATIONS

International Search Report of International Application No. PCT/IB2019/051674 mailed Nov. 15, 2019.

*Primary Examiner* — Jonathan P Masinick
(74) *Attorney, Agent, or Firm* — Ping Wang; Kalos Athena Wang PLLC

(57) ABSTRACT

An animal proof fence (1) comprising one or several panel elements (2) which are provided to extend upright to form a barrier, wherein the fence (1) comprises an upper zone (A) wherein at the height of the upper zone (A) the one or several panel elements (2) comprise a smooth unperforated surface on which reptiles, such as snakes, amphibians and small mammals cannot climb and a lower zone (B) wherein at the height of the lower zone (B) the one or several panel elements (2) comprise perforations allowing view through the fence (1).

12 Claims, 4 Drawing Sheets

(56) References Cited

U.S. PATENT DOCUMENTS

| | | | | |
|---|---|---|---|---|
| 6,199,831 | B1 * | 3/2001 | Patrick | E04H 17/003 |
| | | | | 256/25 |
| 7,040,605 | B2 * | 5/2006 | Lappen | E04H 17/1602 |
| | | | | 256/10 |
| 7,862,010 | B2 * | 1/2011 | Saura Sotillos | E01F 8/025 |
| | | | | 405/16 |
| 8,616,531 | B2 * | 12/2013 | Hough | E04H 17/004 |
| | | | | 256/11 |
| 8,820,722 | B2 * | 9/2014 | Reinert, Sr. | E04H 17/17 |
| | | | | 256/65.14 |
| 8,840,090 | B2 * | 9/2014 | Moore | A01M 29/30 |
| | | | | 256/11 |
| 8,910,925 | B2 * | 12/2014 | Payne | E04H 17/24 |
| | | | | 256/45 |
| 2018/0371789 | A1 * | 12/2018 | Moore | E04H 17/1413 |
| 2019/0003203 | A1 | 1/2019 | Swensson | |

FOREIGN PATENT DOCUMENTS

| | | | | | |
|---|---|---|---|---|---|
| DE | 3933219 | A1 | * | 4/1991 | |
| DE | 4210998 | A1 | * | 10/1992 | |
| DE | 9318306 | U1 | * | 3/1994 | |
| DE | 19730244 | | | 7/1999 | |
| DE | 29917244 | U1 | * | 1/2000 | ........... E04H 17/161 |
| DE | 102009006011 | A1 | * | 7/2010 | ........... E04H 17/165 |
| DE | 102015205640 | A1 | * | 9/2016 | ........... E04H 17/161 |
| DE | 202017001326 | U1 | * | 3/2018 | |
| DE | 202019101187 | U1 | * | 5/2019 | |
| DE | 202019102663 | U1 | * | 8/2019 | |
| FR | 3003592 | A1 | * | 9/2014 | ........... E04H 17/163 |
| GB | 2376026 | A | * | 12/2002 | ............ E04H 17/00 |
| GB | 2584460 | A | * | 12/2020 | ............ E02D 29/02 |
| KR | 20090041280 | A | * | 4/2009 | |
| KR | 101197013 | B1 | * | 11/2012 | |
| WO | 0134924 | | | 5/2001 | |
| WO | 2010111032 | | | 9/2010 | |

* cited by examiner

ANIMAL PROOF FENCE

This application is a national stage application of International Patent Application No. PCT/IB2019/051674, filed Mar. 1, 2019. The entirety of the aforementioned applications is incorporated herein by reference.

FIELD

The present invention relates to an animal proof fence comprising one or several panel elements which are provided to extend upright to form a barrier.

BACKGROUND

An animal proof fence is used to mitigate the access of reptiles, such as snakes, amphibians, mammals, such as rodents, rabbits, etc. These fences can for example be used to keep these animals out of yards, industrial environments, recreational environments, etc.

These animal proof fences thus must form a sufficient barrier for animals, but preferably these fences must also be able to withstand weather effects such as strong winds. It is also preferred that these fences can be easily manufactured and can be easily assembled on site. An animal proof fence can also be indicated as a mitigation fence.

WO 2010/111032 describes an animal proof fence (animal proof barrier) comprising a fence with fencing material, such as for example fencing mesh, and comprising a hood attached to the fence at the height of the top of the fence. Animals such as snakes, rodents, etc. can easily climb fences comprising wire panels, fencing mesh, slats, etc. These animals can thus easily climb the fencing material described in WO 2010/111032. However the presence of the hood prevents the animals from climbing over the fence. The disadvantages here is that an additional hood needs to be connected to the fence. This requires extra material and additional work during installation of the fence.

It is therefore an object of the invention to provide an animal proof fence which is less complex and which can be easily installed.

The object of the invention is achieved by an animal proof fence comprising one or several panel elements which are provided to extend upright to form a barrier, wherein the fence comprises an upper zone wherein at the height of the upper zone the one or several panel elements comprise a smooth unperforated surface on which reptiles, such as snakes, amphibians and small mammals cannot climb and a lower zone wherein at the height of the lower zone at least one of the one or several panel elements comprise perforations allowing view through the fence. Preferably at the height of the lower zone, all of the one or several panel elements comprise perforations allowing view through the fence. Also preferably at the height of the upper zone and situated on the side where the animals must be stopped, the one or several panel elements only comprise a smooth unperforated surface.

The upper zone of the fence is located above the lower zone of the fence in the installed state of the fence. The fence extends over a certain length. Preferably the height of the lower zone is the same over the entire length of the fence and also preferably the height of the upper zone is the same over the entire length. However, there can also be embodiments where the height of the lower zone fluctuates according to the length direction such that a part of the upper zone can be located at a lower height than a part of the lower zone which is located at a distance of said part of the upper zone according to the length direction.

A smooth unperforated surface which extends upright cannot be easily climbed by reptiles, such as snakes, and rodents and amphibians, etc. Because of the smooth upright extending surface, the animals will slide down if they try to climb up the upper zone of the fence. This means that the animals cannot climb over the fence. Preferably at the height of the upper zone the one or several panel elements comprise two of said smooth unperforated surfaces which extend opposite each other. However, if they only have one said smooth surface, the fence is placed so that said smooth surfaces are situated on the side where the animals must be stopped.

In the lower zone at least one of the one or several panel elements comprises perforations allowing view through the fence. It is often desirable that one can see through the fence. This can be for aesthetic reasons, but this can also be for safety reasons. Another advantage is that such perforations allow the passage of wind such that this fence can be provided with sufficient strength and this without needing big foundations, support bars, etc. Here the animals can for example climb the fence at the height of the lower zone, but will slide down once they reach the upper zone. Because of the perforations the fence comprises less material and is lighter such that the installation can be done more easily.

The dimensions of the perforations are off course of such dimensions that the animals, which the fence must stop, cannot climb through the perforations. The perforations are thus sufficiently small.

Preferably the fence extends according to a length direction and the upper zone extends substantially over the entire length of the fence, such that according to the entire length of the fence, there is no place on which the animals can climb over the fence. A fence has also a certain height, according to a vertical direction and a certain width or thickness.

Since the one or several panel elements form the barrier, and because of said upper zone, animals cannot climb over the fence and one must not provide in additional elements to prevent animals from climbing over the fence, such that this fence can be made less complex. Because of this the width of the fence can also be limited. This does however not exclude that one can provide the fence with additional structures such as for example barbed wire or dental strips.

One panel element can be part of both the upper zone and the lower zone of the fence. This panel element has then an upper section which comprises said smooth unperforated surface and is part of the upper zone and a lower section which preferably comprises a surface with perforations and is part of the lower zone. In certain embodiments certain panel elements will form part of the upper zone, while other panel elements will form part of the lower zone. In these embodiments one then must provide panel elements with perforations, such as wire panels, panels made of expanded metal, panels comprising slats, wherein these panels are then used to form the lower zone of the fence and one must also provide in panel elements with smooth unperforated surfaces, such as panels made of smooth sheet metal, panels with a smooth surface made of resins, etc. A said panel element with a smooth unperforated surface can be easily installed above a said panel element with a perforated surface.

Preferably the lower zone is provided to extend completely aboveground in installed state of the fence.

Also preferably the fence comprises one or several posts to anchor these one or several panel elements with respect to the ground, such that this fence has sufficient strength and can withstand impact forces and weather conditions. These posts are then preferably anchored in the ground with the aid of concrete. Also preferably the posts are manufactured in such a way and/or are installed in such a way that they do not help the animals to climb over the fence. For example the posts can be located at the height of the side of the panel elements, which lies opposite the side of the panel elements where the animals must be stopped.

Preferably the panel elements are provided to extend according to a vertical direction in the installed state of the fence.

In a preferred embodiment at least one of the one or several panel elements are made of sheet metal. Preferably all the one or several panel elements are made of sheet metal. Panel elements made of sheet metal can be easily manufactured in such a way that they are strong and can withstand weather conditions in a sufficient matter. Also one can easily provide panel elements with a smooth surface or a zone with a smooth surface and one can easily provide panel elements with a perforated surface, for example by using expanded metal, or a zone with a perforated surface. Sheet metal, when not perforated, is also very smooth such that it is very suitable for preventing animals from climbing over the fence.

Preferably at the height of the lower zone, at least one of the one or several panel elements are made of expanded metal and even more preferably all of the one or several panel elements are made of expanded metal.

In a preferred embodiment the fence extends over a certain length and the fence comprises several panel elements which extend next to each other according to the length of the fence wherein each panel element comprises an upper section which forms part of the upper zone and a lower section which forms part of the lower zone. Such panel elements can be easily placed next to each other and anchored to anchoring elements such as posts to form a firm fence. Preferably the fence extends according to a rectilinear length direction. The upper section comprises said smooth unperforated surface.

In a specific embodiment the fence comprises at least one set of two or more of said panel elements wherein said panel elements are arranged consecutive above one another and wherein the panel element of said set that extends at the top comprises a smooth unperforated surface and forms part of the upper zone of the fence and the other one or more panel elements of said set comprise perforations and form part of the lower zone of the fence. Here one can easily provide panel elements which are suitable to be part of the upper zone or panel elements which are suitable to be part of the lower zone. Here it is also easy to have several embodiments. For example one can provide panel elements made of fencing mesh, wires, slats etc. for forming the lower zone.

Further preferably the said panel elements of a said set are arranged consecutive above one another in such a way that they extend substantially adjacent to each other. The distance between the panel elements of a said set according to the upright direction is then sufficiently small such that said animals cannot climb between the panel elements of a said set.

Also further preferably the fence extends over a certain length and comprises two or more of said sets, wherein these sets extend next to each other according to the length of the fence. Here it is easy to obtain fences of the desired length.

Preferably the upper zone has a minimum height of 36 cm, more preferably a minimum height of 46 cm and even more preferably a minimum height of 60 cm. With the height the dimension of the upper zone according to upright direction in installed state of the fence is indicated. Preferably the upright direction is the vertical direction, such that the height is then the dimension according to the vertical direction. Here the upper zone has a sufficient height, ensuring that the said animals cannot climb over the upper zone. The greater the height of the upper zone, the better the fence is capable of stopping animals, however out of aesthetic reasons, cost reasons and installation reasons it can be preferred that the height of the upper zone is less than 60 cm.

Further preferably when the fence comprises a said set, the said panel element of a said set that extends at the top, has a minimum height of 36 cm, preferably a minimum height of 46 cm and more preferably a minimum height of 60 cm.

Further preferably if the panel element comprises a said upper section which forms part of the upper zone and a said lower section which forms part of the lower zone, the upper section has a minimum height of 36 cm, preferably a minimum height of 46 cm and more preferably a minimum height of 60 cm.

Also further preferably the total aboveground height of the fence is minimum 76 cm, more preferably minimum 200 cm and more preferably minimum 300 cm. Preferably the total aboveground height of the one or several panel elements is minimum 76 cm, more preferably minimum 200 cm and more preferably minimum 300 cm. The greater the height of the fence, the better the fence is capable of stopping animals, however out of aesthetic reasons, cost reasons and installation reasons it can be preferred that the height of the fence is less than 300 cm.

In a specific embodiment the fence comprises an underground zone which is provided to extend underground in installed state of the fence, wherein this underground zone comprises upright extending panel elements, which are preferably perforated panel elements. These upright extending panel elements, which are located underground in installed state of the fence, prevent animals from digging under the fence. For example in an area with rabbits, this can be useful. When the fence comprises posts to anchor the fence in the ground, a part of each post is preferably part of the underground zone.

In a specific embodiment the fence comprises an upper element comprising barbed wire and/or a dental strip, wherein said upper element extends above the one or more panel elements which form part of the upper zone. This upper element can be connected to said panel elements. With the aid of a said upper element, it is even better ensured that animals cannot climb over the fence. This also makes climbing over the fence for people more difficult.

BRIEF DESCRIPTION OF THE DRAWINGS

The present invention is now explained in greater detail below with reference to the following detailed description of some preferred embodiments of an animal proof fence according to the present invention. The aim of this description is solely to give illustrative examples and indicate further advantages and particularities and thus cannot be interpreted as a limitation of the field of application of the invention or of the patent rights claimed in the claims.

In this detailed description, reference is made by means of reference numerals to the appended drawings, wherein.

DETAILED DESCRIPTION

Figure 1:
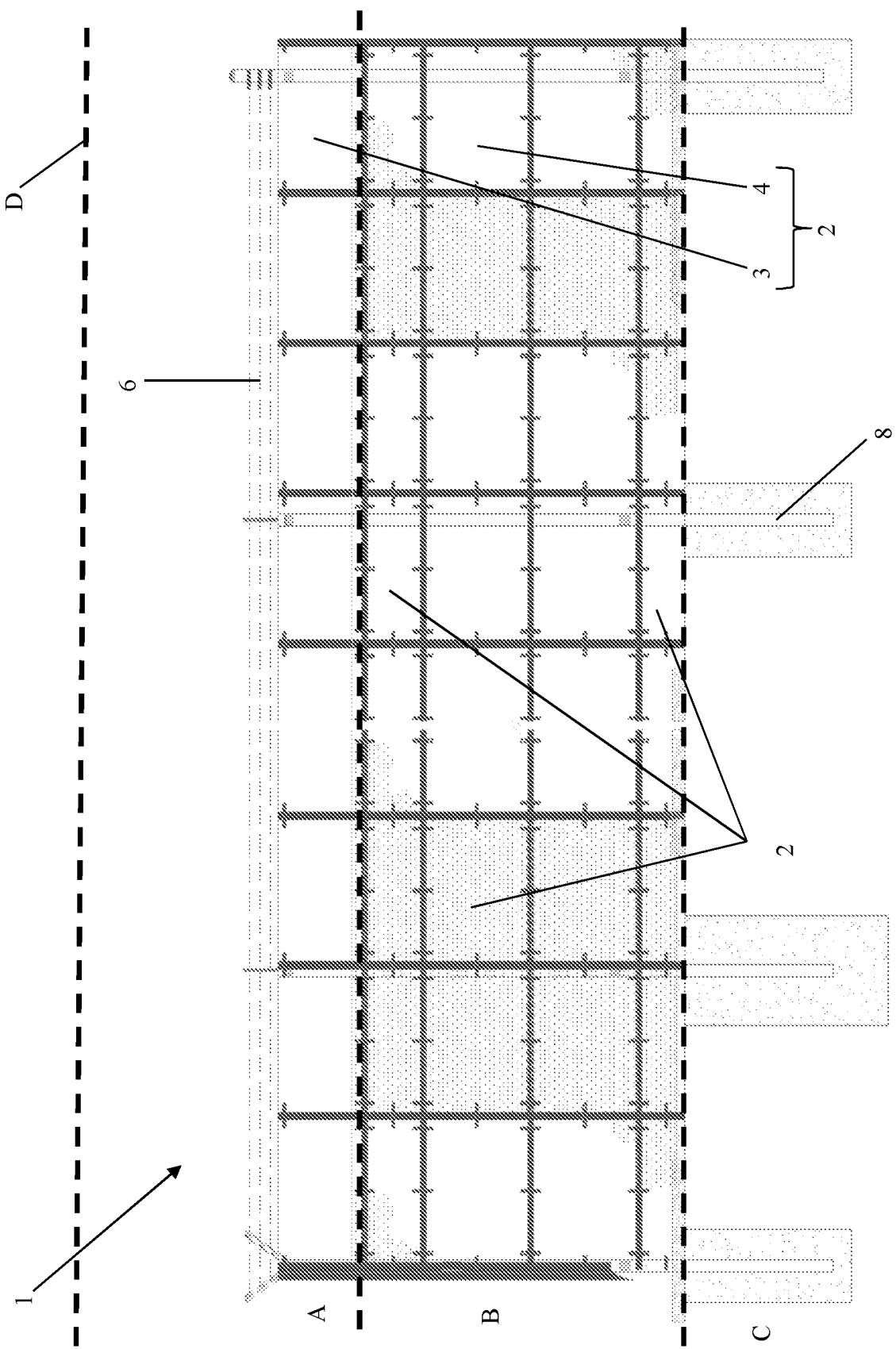
FIG. 1 is a first embodiment of a fence according to the invention.

The different embodiments of the animal proof fences (1) shown in the figures all comprise several panel elements (2), panels (2), which are provided to extend substantially vertical to form a barrier in the installed state of the fence (1). These fences (1) comprise an upper zone (A) wherein at the height of the upper zone (A) the panel elements (2) comprise a smooth unperforated surface on which reptiles, such as snakes, amphibians and small mammals cannot climb and a lower zone (B) wherein at the height of the lower zone (B) the panel elements (2) comprise perforations allowing view through the fence (1). The fence (1) has a certain length and extends according to a length direction (D). These panel elements (2) extend next to each other according to this length direction (D), such that the fence (1) has a certain length. Every panel element (2) is made of sheet metal and each panel element (2) has an upper section (3) which forms part of the upper zone (A) and a lower section (4) which forms part of the lower zone (B). The upper section (3) comprises a smooth metal surface and the lower section (4) comprises expanded metal and is thus perforated.

Figure 2:
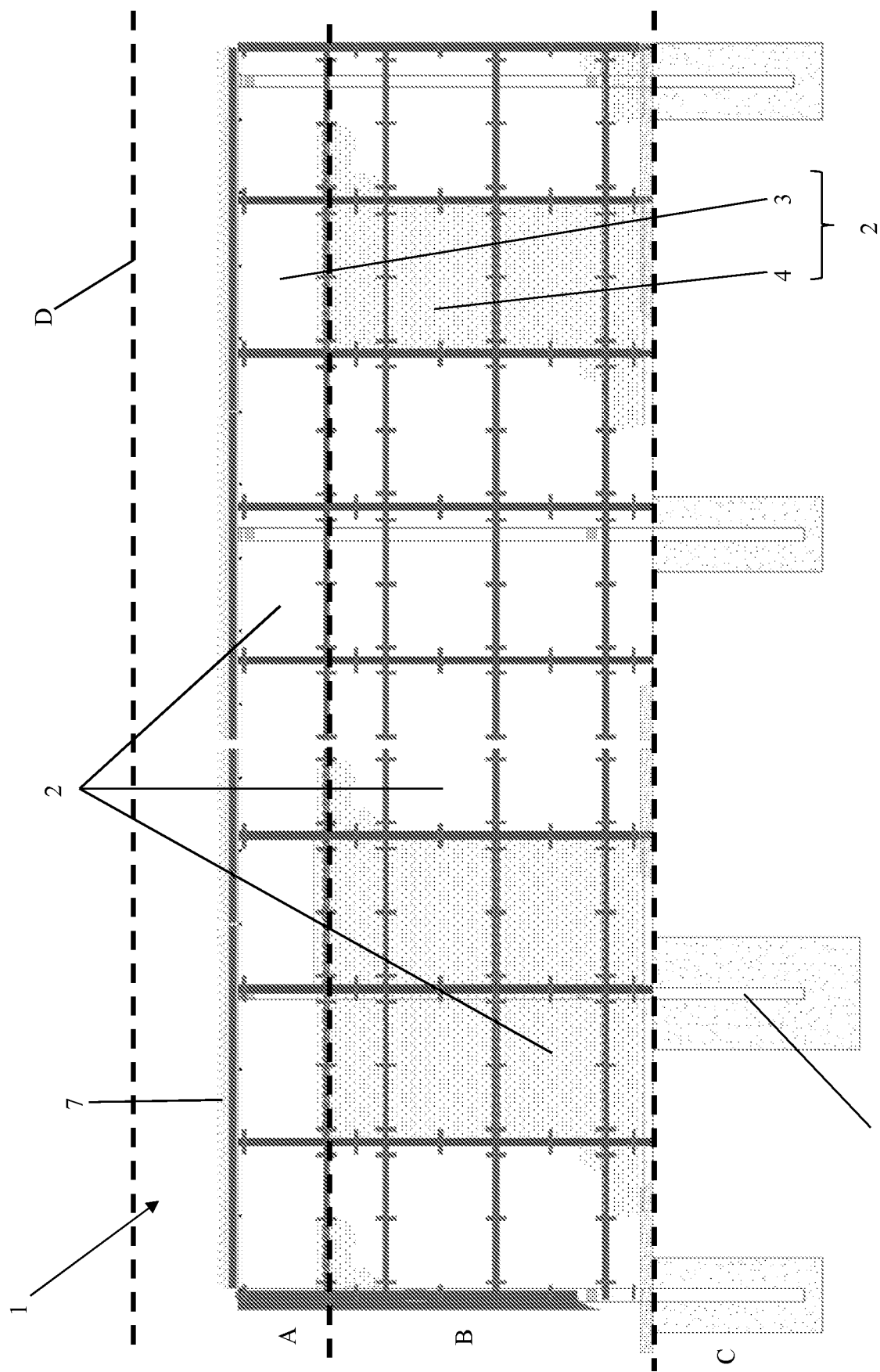
FIG. 2 is a second embodiment of a fence according to the invention.
Figure 3:
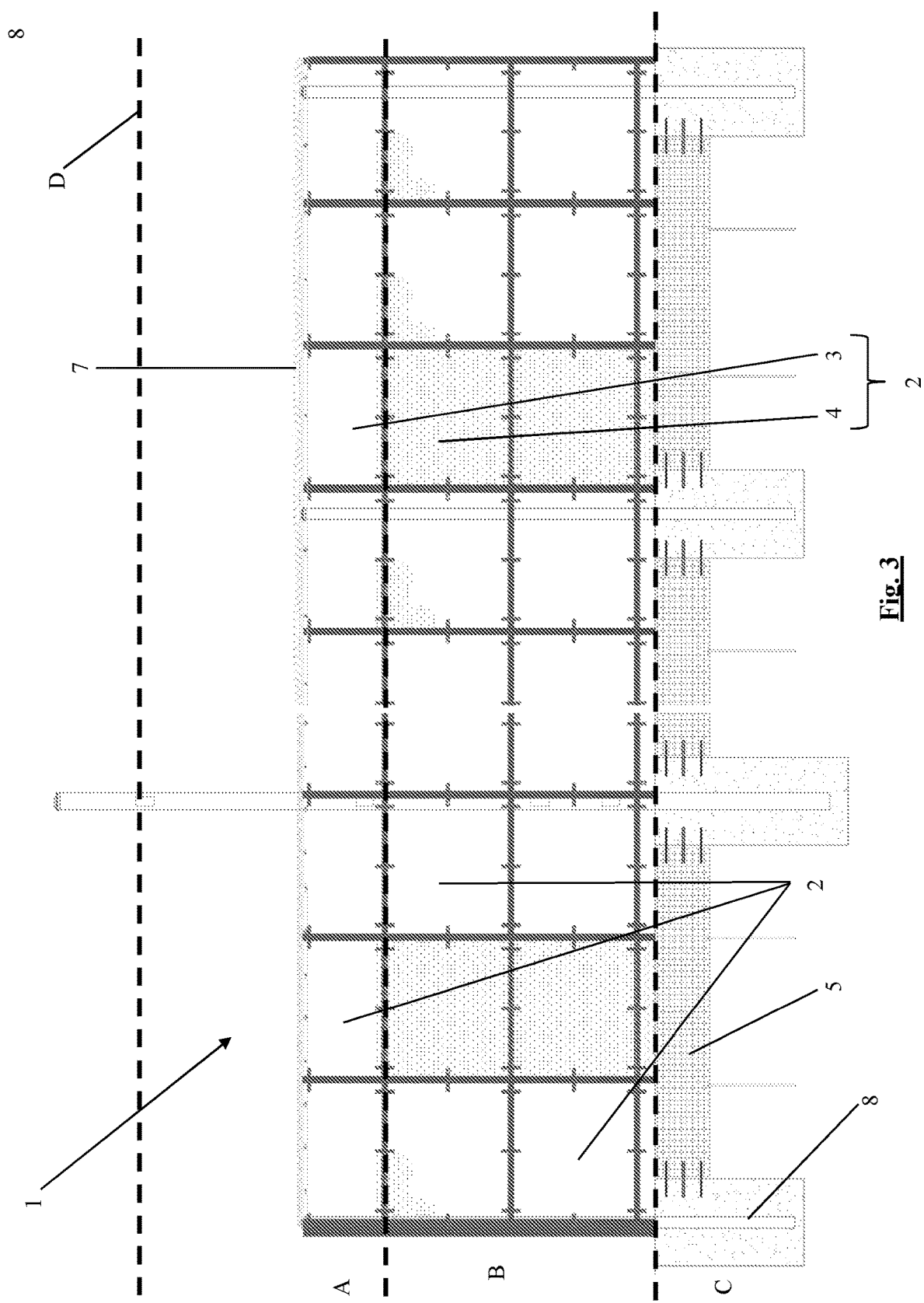
FIG. 3 is a third embodiment of a fence according to the invention.
Figure 4:
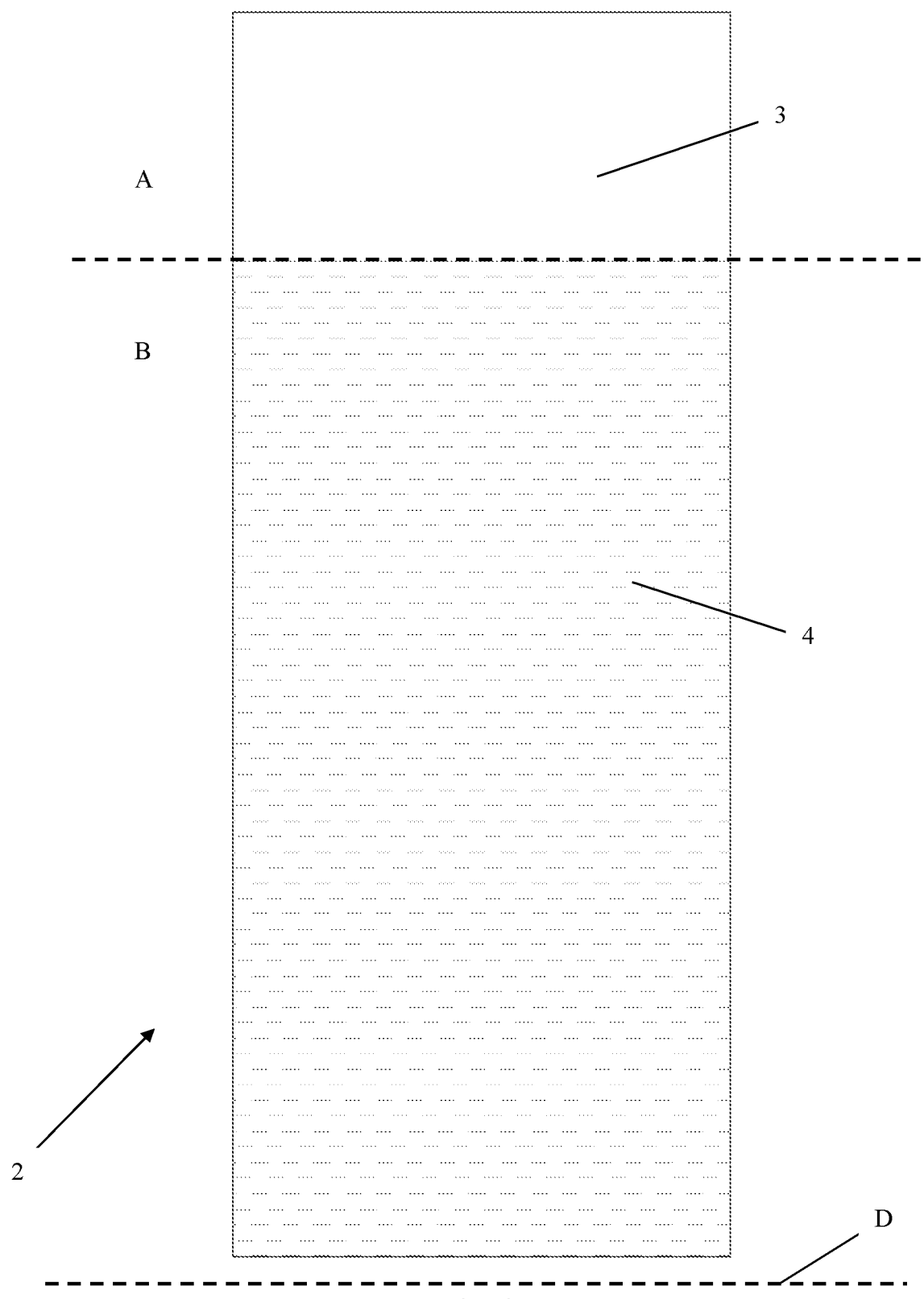
FIG. 4 is a panel element of the abovementioned embodiments of a fence according to the invention.

The upper section (3) has a height, being the dimension according to the vertical direction in installed state of the fence (1), of more than 45 cm and the total height of the panel element (2) is more than 200 cm. FIG. 4 shows a detail of a panel element (2). All the embodiments shown in FIGS. 1, 2 and 3 comprises such panel elements (2).

In all embodiments these panel elements (2) are anchored with the aid of posts (8), which are anchored into the ground with the aid of concrete. All the embodiments further comprise horizontal extending bars, vertical extending bars and connecting elements to further connect the panel elements (2) to each other and to the said posts (8).

In the embodiment shown in FIG. 1 the fence (1) further comprises barbed wire (6) which extends above the panel elements (2). In the embodiments shown in FIGS. 2 and 3 the fence (1) further comprises (extended) dental strips (7) which extend above the panel elements. (2).

The fence (1) according to all the embodiments has an underground zone (C) which is provided to extend underground in installed state of the fence (1). In the embodiments shown in FIGS. 1 and 2 this underground zone (C) only comprises the bottom part of the posts (8). In the embodiment shown in FIG. 3 the underground zone (C) also comprises wire panels (5) which extend vertical.

The invention claimed is:

1. An animal proof fence (1) comprising:
one or several panel elements (2), which are provided to extend upright to form a barrier, wherein the fence (1) comprises:
an upper zone (A), wherein at the upper zone (A) the one or several panel elements (2) comprise a smooth unperforated surface on which reptiles, amphibians and small mammals cannot climb, and
a lower zone (B), wherein at the lower zone (B) at least one of the one or several panel elements (2) are made of expanded metal such that they comprise perforations allowing view through the fence (1);
wherein the smooth unperforated surface of one or several panel elements of upper zone (A) and the expanded metal of the one or several panel elements of the lower zone (B) are arranged to extend upright consecutively with the smooth unperforated surface above the expanded metal of the lower zone in the same plane;
wherein each of the one or several panel elements is a single piece and each panel element (2) has an upper section (3) which forms part of the upper zone (A) and comprises a smooth unperforated surface and a lower section (4) which forms part of the lower zone (B) and comprises expanded metal; and wherein the animal proof fence does not comprise a hood.

2. The animal proof fence (1) according to claim 1, wherein at least one of the one or several panel elements (2) are made of sheet metal.

3. The animal proof fence (1) according to claim 1, wherein the fence (1) extends over a certain length and the fence (1) comprises several panel elements (2) which extend next to each other according to the length of the fence (1).

4. The animal proof fence (1) according to claim 1, wherein the upper zone (A) has a minimum height of 36 cm.

5. The animal proof fence (1) according to claim 4, wherein the upper zone (A) has a minimum height of 46 cm.

6. The animal proof fence (1) according to claim 5, wherein the upper zone (A) has a minimum height of 60 cm.

7. The animal proof fence (1) according to claim 1, wherein the total aboveground height of the fence (1) is minimum 76 cm.

8. The animal proof fence (1) according to claim 7, wherein the total above ground height of the fence (1) is minimum 200 cm.

9. The animal proof fence (1) according to claim 8, wherein the total above ground height of the fence (1) is minimum 300 cm.

10. The animal proof fence (1) according to claim 1, wherein the fence (1) comprises an underground zone (C) which is provided to extend underground in an installed state of the fence (1), wherein this underground zone (C) comprises upright extending panel elements (5).

11. The animal proof fence (1) according to claim 10, wherein the upright extending panels elements (5) are perforated panel elements (5).

12. The animal proof fence (1) according to claim 1, wherein the fence (1) comprises an upper element comprising barbed wire (6) and/or a dental strip (7), wherein said upper element extends above the one or more panel elements (2) which form part of the upper zone (A).

* * * * *